United States Patent Office 2,696,305
Patented Dec. 7, 1954

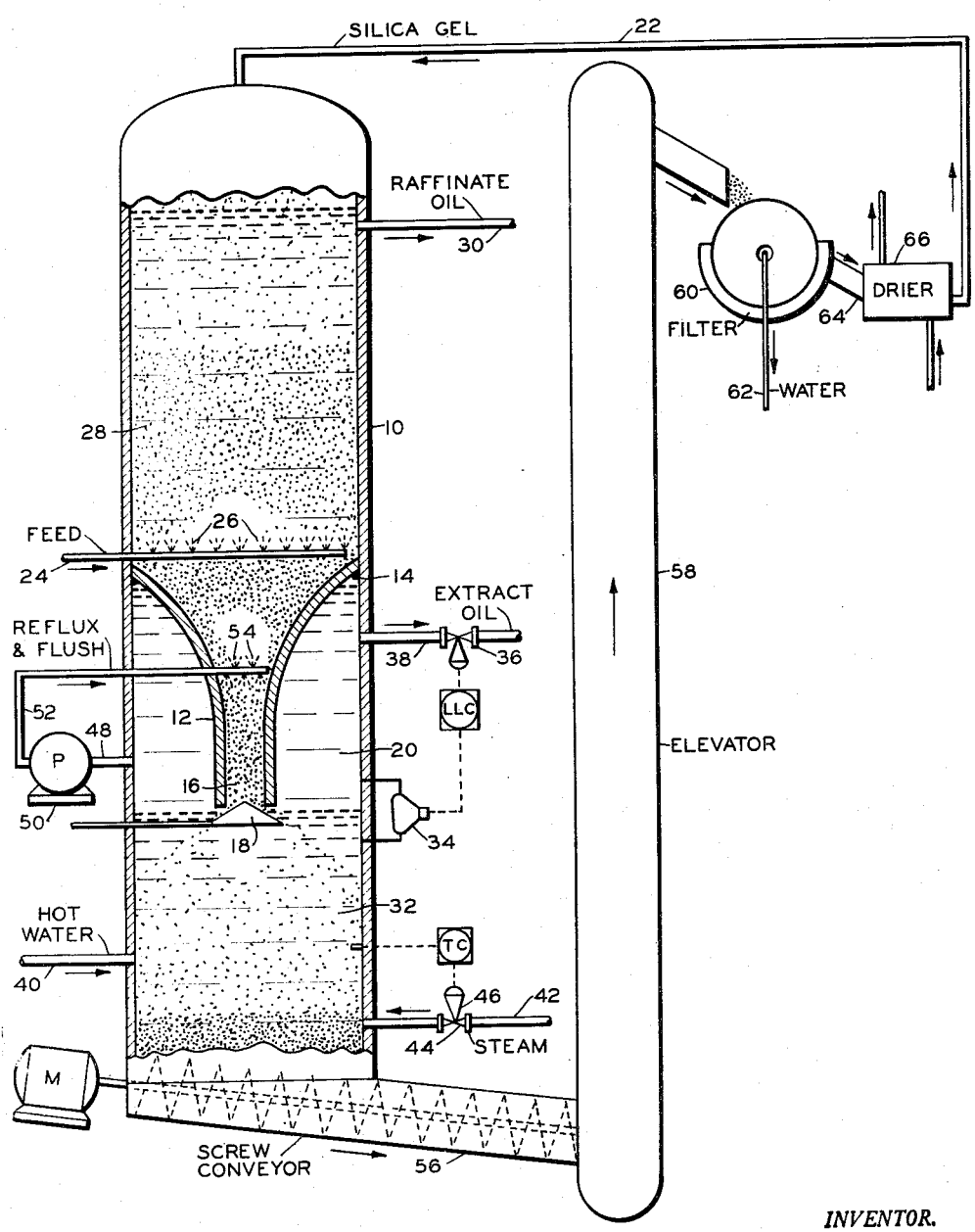

2,696,305

CONTINUOUS ADSORPTION PROCESS AND APPARATUS

James W. Slover, Bartlesville, Okla., assignor to Phillips Petroleum Company, a corporation of Delaware Application October 24, 1949, Serial No. 123,274

11 Claims. (Cl. 210—42.5)

This invention relates to a continuous method for separating organic mixtures into constituents by selective adsorption. In one of its specific aspects, the invention pertains to improvements in such adsorption process and apparatus wherein a downwardly moving bed of adsorbent is employed, and is contacted with a desorption liquid which is more readily adsorbed than the organic material treated. In one of the preferred embodiments, heated water or alcohol is used to desorb the adsorbed organic material in an apparatus particularly designed to minimize packing of the moving solid adsorbent normally caused by wetting of the adsorbent.

It has long been known to contact a liquid mixture of organic materials with solid adsorbents, usually silica gel or activated charcoal, although many other adsorbents such as activated alumina, bauxite, magnesia, etc. may be used, whereby the more readily adsorbed component or components are taken up by the solid and the less readily adsorbed component or components remain unadsorbed. In this manner a separation may be obtained between components of a two component mixture, or a complex mixture may be separated into two fractions of different characteristics according to adsorbability. By repeated treatment, three or more fractions of different character may be separated. While several methods of recovering the adsorbed material from the solid are available, perhaps the most common is the use of a different liquid for which the solid adsorbent has more affinity than the organic material which it has adsorbed. Thus, a hydrocarbon mixture containing paraffins and aromatics may be contacted in the liquid phase with silica gel under conditions at which the paraffins are unadsorbed and the aromatic material is adsorbed. The paraffinic material is physically separated as one product from the gel, and the latter is then treated with hot water whereby water is adsorbed by the gel displacing the aromatic material which is thus recovered as the other product.

Lately, this basic process which has long been used by batch procedures has been developed into a continuous process, in which the silica gel or other solid adsorbent, in the form of powder or small granules is passed downwardly in the form of a compact bed or columnar mass in contact with the hydrocarbon or other liquid material which is being treated. The liquid feed is introduced at an intermediate or low point in the column of gel, and the unadsorbed so-called raffinate is withdrawn from the top. The adsorbed material or so-called extract is separated from the gel by a number of methods, either in the same column or in a separate column. The potential advantages of such a continuous process are obvious. However, many difficulties are encountered in attempting to convert the batch or semi-batch procedure formerly used to a truly continuous procedure. Thus, satisfactory movement of the wetted gel through a column, valves, conveyors, elevators, etc. is not readily attained. Sufficient and adequate contact between gel and the liquid being treated and liquid desorbents is sometimes difficult to accomplish. Clean cut separations avoiding contaminations of either raffinate or extract with each other or with desorbent are required but not always obtained. Particularly when the hydrocarbon-wetted gel is brought into contact with a desorbing liquid which is non-miscible with hydrocarbons, packing of the gel and agglomeration of the gel into lumps becomes a serious problem.

It is therefore an object of this invention to provide a continuous adsorption process for the fractionation of liquid organic compounds.

It is another object of this invention to provide a continuous adsorption process for the fractionation of liquid petroleum stocks.

It is a further object of this invention to provide a continuous adsorption process in which the selectively adsorbed material or extract may be recovered in substantial yields.

It is still another object of this invention to provide a continuous adsorption process in which the regeneration of the adsorbent is accomplished at moderate temperatures.

A further object of the invention is to overcome mechanical difficulties encountered when a gel wetted with a water-insoluble organic liquid is contacted with water as a desorbent.

Another object is to provide improved apparatus capable of effecting the desired movement of a solid particulate adsorbent relative to various liquids which are subjected to adsorption or which act as desorbents.

Further objects and advantages of the invention will be apparent to one skilled in the art from the accompanying disclosure and discussion.

One preferred embodiment of my improved process and apparatus is illustrated in the accompanying diagrammatic drawing which shows the adsorption-desorption column in vertical cross section and the remainder of the system schematically. The various principles of the invention and some of the specific modifications coming within the scope of the invention will be explained in conjunction with the drawing.

In the drawing a vertical cylindrical column 10 is provided, the diameter and height being selected in accordance with the size of plant required. Within the column 10 there is provided a throat 12 which is generally funnel shaped and preferably has only surfaces which contain no abrupt changes of direction. This throat 12 takes the approximate shape of an inverted frustum of a cone, with the periphery of the inverted base of the cone being welded or otherwise attached to the inner wall of column 10 around a circular section thereof as at 14. Preferably throat 12 from its maximum diameter at 14 gradually converges with a surface curved slightly inwardly and terminates at its lower end in a short essentially cylindrical portion 16 having a diameter not greater than ¼ the diameter of column 10. I will refer herein to throat 12 as being of a frusto-conical shape, it being understood that this term is used in a broad sense as including a throat such as shown in the drawing which has curved surfaces. At the lower end or mouth 16 of throat 12 there is provided a vibrating element 18 which may take any suitable form but preferably assumes that shown in the drawing, i. e., a cone having its apex pointing into mouth 16 of throat 12. Vibration of feed controller 18 is accomplished by any suitable mechanical means, readily supplied by one skilled in the art, but not shown on the drawing for the sake of simplicity. Alternatively but less desirably this may be a feeder of rotating or other known type. It will be observed that an annular space 20 is formed between throat 12 and column 10 below the circle 14 at which these two apparatus elements are joined.

A suitable solid adsorbent such as silica gel of a size ranging from 30 to 60 mesh on down to 200 mesh (which latter is a fine powder), is introduced into the top of column 10 via line 22, ordinarily in a heated condition from a drying step hereinafter described. Liquid feed to be treated, for instance a narrow boiling hydrocarbon fraction containing paraffins and aromatics with or without other types of hydrocarbon components and which cannot readily be separated by fractional distillation, is introduced into column 10 from line 24, preferably at the approximate level of the juncture 14 of throat 12 with column 10 although the feed introduction may be at a higher point in the column. Line 24 is connected with a distribution device 26 placed within column 10 and adapted to effect an even distribution of the feed within the horizontal cross section of column 10. The silica gel introduced at the top of the column settles down into a compact mass or bed 28, which is allowed to move slowly downwardly through the column. The aromatic components of the feed are selectively adsorbed by the silica gel and carried downward therewith, while the paraffinic components are not adsorbed and flow upwardly through column 10. The column is maintained essentially liquid full up to withdrawal line 30 at the top of the column 10, through which the product raffinate oil, i. e., the non-adsorbed paraffinic constituents of the feed, is withdrawn.

The rates of flow of silica gel bed 28 and fresh gel entering the top from line 22 are adjusted so that the top of silica gel bed 28 is maintained somewhat below the liquid level of raffinate oil which is maintained by continuous overflow through line 30. The hot gel introduced at the top through line 22 thus drops loosely down through the liquid raffinate oil and settles down upon the top of the moving gel bed 28. Since the adsorption is usually effected at normal room temperature or thereabouts, the hot gel is cooled by contact with the raffinate oil, this cooling being effected fairly gradually by virtue of the fact that the gel first contacts the hottest raffinate at the liquid level and then contacts cooler and cooler raffinate as it settles down through the silica gel bed. If necessary or desired, the gel may be introduced into line 22 through a plurality of inlets to provide a more even distribution thereof over the cross section of column 10.

The gel bed moves downwardly through column 10 and on down past the point of feed inlet into and through throat 12. Its rate of flow is controlled by vibration of feed control cone 18 interposed into mouth 16 of throat 12 and upon which the gel bed rests. The faster the vibration of controller 18 the more rapidly the gel is allowed to drop through the mouth 16 of throat 12 into the space in column 10 therebelow. As the gel thus drops from the throat in a highly dispersed condition, as contrasted with the compact condition of the gel bed 28, it comes in contact with a liquid body 32 of hot water or other desorbent which is non-miscible with hydrocarbons. By non-miscible, I mean that two liquid phases can be formed, although there may be some mutual solubility. In the embodiment shown in the drawing, the liquid desorbent has a higher specific gravity than the aromatic components of the feed which have been carried downward by adsorption of the gel and which are to be desorbed and recovered. On contacting the desorbent, such as hot water, the gel adsorbs the water and desorbs the aromatic material, which is termed the extract. This extract oil rises to the surface of the water by gravity and accumulates in the annular space 20 between throat 12 and column 10. A liquid level control 34 is employed to maintain the interface between desorbent 32 and extract 20 at the desired level. This level is preferably a few inches below the lower end of mouth 16 of throat 12. This liquid level control operates valve 36 in line 38 which is employed to withdraw extract product from space 20 at the rate necessary to maintain the desired level of the interface. Make-up hot water or other desorbent is introduced into the bottom of column 10 through line 40, and the temperature in the desorption zone 32 may be maintained as high as conveniently possible by additional introduction of steam via line 42 controlled by valve 44 by a temperature controller 46 responsive to the temperature of the desorption zone.

A portion of the extract oil accumulates in space 20, is withdrawn via line 48 by pump 50, and is passed by line 52 through distributor 54 placed within throat 12 at a level considerably lower than the level of feed introduction. This stream of extract oil is introduced into the throat at such a rate that part of it serves as a flush to aid in carrying the gel downwardly through the throat, thus minimizing bridging and packing of the gel in the throat and allowing its ready flow from the bottom thereof over feed control 18 into the desorption zone 32. A portion of the extract recycled into the throat via line 52 and distributor 54 also serves as reflux for the system and displaces from the gel residual raffinate material, both adsorbed and occluded, which flows upwardly for removal at the top, while the reflux is ultimately adsorbed and brought back down past its point of entry and into the desorption zone 32.

By the arrangement just discussed, the silica gel bed which moves downwardly by gravity is aided in its passage through the restricted throat 12 by the flushing action of reflux stream 52. However, the gel is not allowed to come into contact with water in its compacted bed form, but only after it has been dispersed by feeder 18, first into the very lowest portion of the body of extract oil 20 and then down into the body of desorbent 32. This dispersal of the gel effects a rapid and intimate contact of same with the desorbent liquid. However, no difficulty is encountered by agglomeration and packing, which so often are troublesome when it is attempted to move a bed of silica gel in contact with water. By my invention, I have thus obviated in a very simple manner one of the serious troubles encountered in attempting to adapt the adsorption process to a continuous method.

The gel settles down in a dispersed form through the mass 32 of desorption liquid such as hot water, and accumulates at the bottom of column 10 as a shallow bed. From the bottom of the column this gel is picked up by a screw conveyor 56, or by any other suitable means, and passed to an elevator indicated diagrammatically in the drawing by unit 58. This elevator may be of the bucket type or any other suitable form, and discharges at the top onto a rotary filter 60. The desorption zone 32 is maintained at temperatures of 200–210° F. when water is the desorbent liquid, and the gel removed therefrom and passed upwardly in the elevator contains considerable amounts of occluded water. Ordinarily, the elevator is within an enclosed housing connected with an enclosed housing for the screw conveyor, which latter housing in turn is connected with column 10, and a liquid level of water or other liquid desorbent is maintained in the housing of elevator 58 to serve as a liquid seal. If desired, the screw conveyor 56 may be omitted and the elevator 58 adapted to pick up the silica gel directly from the bottom of column 10. The wet silica gel first passes through filter 60, which removes the occluded water via line 62. The silica gel, which may then contain for instance about 40 per cent adsorbed water, is next passed via line 64 to unit 66 which may be a hot air drier, rotary kiln, or other suitable equipment. Dried hot silica gel, at a temperature which may be in the range of 350 to 400° F., is then recirculated via line 22 either by suspension in air or by mechanical means to the top of column 10; in which it first contacts raffinate oil and is thereby cooled as hereinabove described.

In addition to the advantages set forth hereinabove and others which will be apparent to those skilled in the art on reading the present disclosure, it may be pointed out that my invention permits subjecting the adsorbent both to contact with liquid reflux and also to contact with liquid desorbent, all in a single column. Thus, the advantages of a positive reflux are obtained, together with the advantages of liquid phase desorption which minimizes the length of time during which the desorbent must be subjected to high temperature. It has been found more desirable to effect desorption in the liquid phase rather than to remove the extract from the adsorbent by vaporization, as this latter procedure calls for a more extended heat treatment with resulting deleterious effect on the gel, apparently the gel structure itself being effected and the gel also becoming clogged by polymerization or other degradative reactions of adsorbed hydrocarbons.

In view of the fact that the basic physical principles underlying adsorption are now well known to the art, a detailed consideration of same will not be given here. Those skilled in the art will readily understand that the exact conditions to be employed, including temperatures and relative flow rates of adsorbent, feed and reflux, will be greatly dependent on the particular feed stream which it is desired to separate, the degree of separation chosen, and the characteristics of the particular adsorbent used. Similarly, the residence time and temperature required for satisfactory desorption are dependent on the adsorbent, the character of the extract, and the character of the desorbent liquid. The process described may be applied to a wide variety of feed stocks. In addition to the types mentioned specifically hereinabove, wide boiling range gasolines may be treated to effect separation of hydrocarbons merely by type rather than by individual chemical components, virgin or cracked gas oils may be treated to separate same into a highly aromatic extract and a highly paraffinic raffinate, kerosene or other naphtha fractions may be treated to remove aromatics and sulfur compounds therefrom. Narrow boiling aromatic-paraffinic or olefinic-paraffinic cuts may be fractionated by adsorption to produce pure aromatic, paraffinic and olefinic compounds. It will be noted that this adsorption fractionation process is adapted to any desired degree of separation. Thus it may be used to produce a relatively pure compound or it may be used merely to further concentrate the desired compound in its original mixture.

Numerous non-hydrocarbons and particularly non-hydrocarbon organic liquid mixtures may be subjected to adsorption to separate same into group or individual constituents. The separation or fractionation of normally solid or gaseous organic compounds, as well as the employment of normally solid or gaseous organic compounds as desorbing agents, especially those readily liquefied, are within the scope of this invention since they may be changed to liquids by appropriate coordination of two normal process variables, namely, temperature and pressure. For example, this process is readily adaptable to the fractionation of a normally gaseous butene-butadiene liquid mixture by slightly increasing operating pressures. Similarly it is within the scope of this process to purify a normally solid naphthalene stock by conducting the liquid adsorption fractionation at a moderately elevated temperature. With respect to hydrocarbon types in general, polynuclear aromatics are most readily adsorbed, mononuclear aromatics next, and continuing in accordance with decreasing adsorbability are the cyclic olefins, open-chain olefins, naphthenes, and paraffins. Ketones are more readily adsorbed than hydrocarbons, alcohols more than ketones, and water more than alcohols. The relative adsorbability of other liquids are already known to the art, or may be readily determined by trial.

While water has been described herein as the desorption liquid, various other liquids capable of effecting this are known to the art and may be used as determined by convenience or economics, taking into consideration effectiveness for desorbing a particular extract, cost, effect on adsorbent, and ease of removal from adsorbent. Thus, the alcohols, or aqueous alcohols such as aqueous ethanol and methanol, are often employed, being usually somewhat less effective than water but more readily removed from silica gel.

While specific and preferred embodiments of the invention have been described herein, it will be appreciated that other variations may be made in the apparatus and process without departing from the spirit and scope of the invention.

Certain subject matter disclosed herein is disclosed and claimed in the copending application of Forrest E. Gilmore, Serial No. 123,201, filed October 24, 1949.

I claim:

1. A process for continuously separating organic compounds capable of being selectively absorbed by contact in the liquid phase with a solid adsorbent which comprises continuously moving particles of a suitable solid adsorbent agglomerated into a columnar mass or bed downwardly through an adsorption zone, continuously feeding said organic compounds in the liquid phase at an intermediate point into the adsorption zone into contact with the moving mass of adsorbent, continuously withdrawing a liquid non-adsorbed fraction from the upper portion of the adsorption zone, subjecting said columnar mass of adsorbent as it passes downwardly below the point of feed inlet to gradual restriction of cross section, then dispersing the adsorbent particles from the bottom of the resulting columnar mass of restricted cross section loosely into a body of liquid desorbent constituting a desorption zone by continuously maintaining a vibrating zone at the lower end of said mass, said desorbent being non-miscible with the selectively adsorbed fraction of organic compounds, allowing the dispersed particles of adsorbent to settle downward through said desorption liquid in non-aggregated and discrete form effecting desorption by the liquid desorbent of the selectively adsorbed fraction of organic compounds, collecting the liquid fraction thus desorbed as a lighter liquid phase above the level of liquid desorbent and largely out of direct contact with said columnar mass of adsorbent, maintaining the interface between said desorption liquid and said desorbed fraction sufficiently below the bottom of said compacted columnar mass of restricted cross section so as to avoid contact of desorption liquid with the adsorbent while in said compacted form, withdrawing a portion of said phase as a product, withdrawing another portion of said phase and introducing same into said columnar mass of restricted cross section at a rate sufficient to provide reflux liquid to the adsorption zone and downwardly flowing flushing liquid through the restricted cross section mass to the point of dispersion into said desorption zone.

2. A process according to claim 1, wherein said adsorbent is silica gel and said desorption liquid is aqueous.

3. A process according to claim 1, including removing adsorbent wet with desorption liquid from the bottom of said desorption zone and separating same from residual desorption liquid by filtration and drying at an elevated temperature, returning resulting hot adsorbent to the adsorption system and introducing same onto the surface of a body of non-adsorbed liquid fraction maintained above the said columnar mass of adsorbent, and permitting the thus introduced hot adsorbent to settle down through said body of non-adsorbed liquid in dispersed and non-aggregated form to the top of said columnar mass for downward movement in said adsorption zone whereby said hot adsorbent is gradually cooled by contact with said non-adsorbed liquid fraction.

4. A process according to claim 1, wherein said mass is caused to move downward below the point of feed inlet in a compacted mass having a shape approximating that of an inverted frustum of a cone terminating in a cylinder having a diameter not in excess of one-fourth that of the said columnar mass above the point of said inlet.

5. A process for continuously separating an organic compound capable of being selectively adsorbed from a liquid mixture by contact in the liquid phase with a solid adsorbent which comprises continuously moving particles of a suitable solid adsorbent agglomerated into a columnar mass or bed downwardly through an adsorption zone; continuously feeding a liquid mixture containing said organic compound at an intermediate point into the adsorption zone into contact with the moving mass of adsorbent; continuously withdrawing a liquid non-adsorbed fraction from the upper portion of the adsorption zone; below the point of feed inlet, passing said columnar mass of adsorbent through a zone of gradually restricted cross section; then loosely dispersing the adsorbent particles from the bottom of the resulting columnar mass of restricted cross section by maintaining a vibration zone at the lower end of said mass and thereafter gravitating the dispersed adsorbent into a body of liquid desorbent constituting a desorption zone, allowing the dispersed particles of adsorbent to gravitate through said desorption liquid in non-aggregated and discrete form so as to effect desorption by the liquid desorbent of the selectively adsorbed fraction of organic compound; and collecting the liquid fraction thus desorbed in an annular zone surrounding said zone of gradually restricted cross section.

6. The process of claim 5 in which a portion of the desorbed liquid fraction is withdrawn from said annular zone and introduced into said columnar mass of restricted cross section at a rate sufficient to provide reflux liquid to the adsorption zone and to downwardly flow flushing liquid through the restricted cross section mass to the point of dispersion of adsorbent into said desorption zone.

7. Apparatus for the continuous separation of organic liquids into adsorbed and non-adsorbed liquid fractions by contact with a moving mass of particulate solid adsorbent which comprises a vertical cylindrical shell; means for introducing particles of solid adsorbent into the top thereof; means for removing particles of solid adsorbent from the bottom thereof; a funnel attached to said shell completely around the periphery of said funnel so that said funnel is suspended within said shell providing a zone thereabove for containing a compacted columnar mass of moving gel, a funnel shaped zone therein for said compacted mass of moving gel, a lower zone below said funnel in the bottom of said shell for containing desorbent liquid, and an annular collecting space between said funnel and said shell in free communication with said lower zone and closed at its top by the connection of said shell with the periphery of said funnel; a feeder comprising a movable conical member positioned at the lower end of said funnel with its apex partially inserted therein adapted to be vibrated so as to effect continuous dispersal of solid adsorbent from the compacted mass thereof in the funnel into said lower zone, a conduit and distributor inserted within said shell at least as high as the point of connection between funnel and shell for introducing liquid feed to be separated by adsorption, a conduit for withdrawing liquid from the top section of said shell, a conduit for introducing desorption liquid into the bottom section of said shell; a pump and conduit for withdrawing desorbed liquid from said annular space between funnel and shell and introducing same within the interior of said funnel for upward and downward flow through the compacted mass of adsorbent particles therein, and means for withdrawing said desorbed liquid from said annular space.

8. An apparatus according to claim 7, including a liquid level controller for maintaining a liquid-liquid interface near said feeder but below the lower end of said funnel.

9. Apparatus for the continuous separation of organic liquids into adsorbed and non-adsorbed liquid fractions by contact with a gravitating mass of particulate solid adsorbent which comprises a vertical cylindrical shell; means for introducing particles of solid adsorbent into the upper end thereof; means for removing particles of solid adsorbent from the lower end thereof; a downwardly converging funnel attached to an intermediate section of said shell completely around the periphery of said funnel so that said funnel is suspended within said shell thereby providing an adsorption zone in the upper section of said shell for contacting a compact columnar mass of moving gel with liquid organic materials, a desorption zone below said funnel in the lower section of said shell for contacting charged adsorbent with desorbent liquid, and an annular collecting space between said funnel and said shell in open communication with said desorption zone but closed at its top by the union of said shell with the periphery of said funnel; a vibratory feeder member disposed at the lower end of said funnel and adapted to continually feed and disperse solid adsorbent from the compacted mass thereof in the funnel into said desorption zone; a feed inlet conduit and distributor inserted within said shell in the lower portion of said adsorption zone; an outlet conduit in said shell in the upper portion of said adsorption zone; an inlet conduit in said shell in the lower portion of said desorption zone; and an outlet conduit in said shell connecting with said annular collecting space.

10. The apparatus of claim 9 including a recycle line connecting said annular space with the interior of said funnel and a pump in said recycle line for passing reflux and flushing liquid into said funnel.

11. The apparatus of claim 9 including a liquid level controller communicating with the interior of said shell at the approximate level of the lower end of said funnel and with a valve in the outlet conduit from said annular space.

References Cited in the file of this patent

UNITED STATES PATENTS

| Number | Name | Date |
|---|---|---|
| 1,595,603 | Heffner et al. | Aug. 10, 1926 |
| 2,263,688 | Allen et al. | Nov. 25, 1941 |
| 2,298,593 | Rubin et al. | Oct. 13, 1942 |
| 2,448,489 | Hirschler | Aug. 31, 1948 |
| 2,449,402 | Lipkin et al. | Sept. 14, 1948 |
| 2,470,339 | Claussen et al. | May 17, 1949 |
| 2,571,936 | Patterson et al. | Oct. 16, 1951 |
| 2,589,981 | Weeks | Mar. 18, 1952 |
| 2,631,969 | Klueger | Mar. 17, 1953 |